L. G. McCORRY.
OIL HEATER.
APPLICATION FILED MAR. 31, 1914.
1,178,405.
Patented Apr. 4, 1916.
2 SHEETS—SHEET 1.
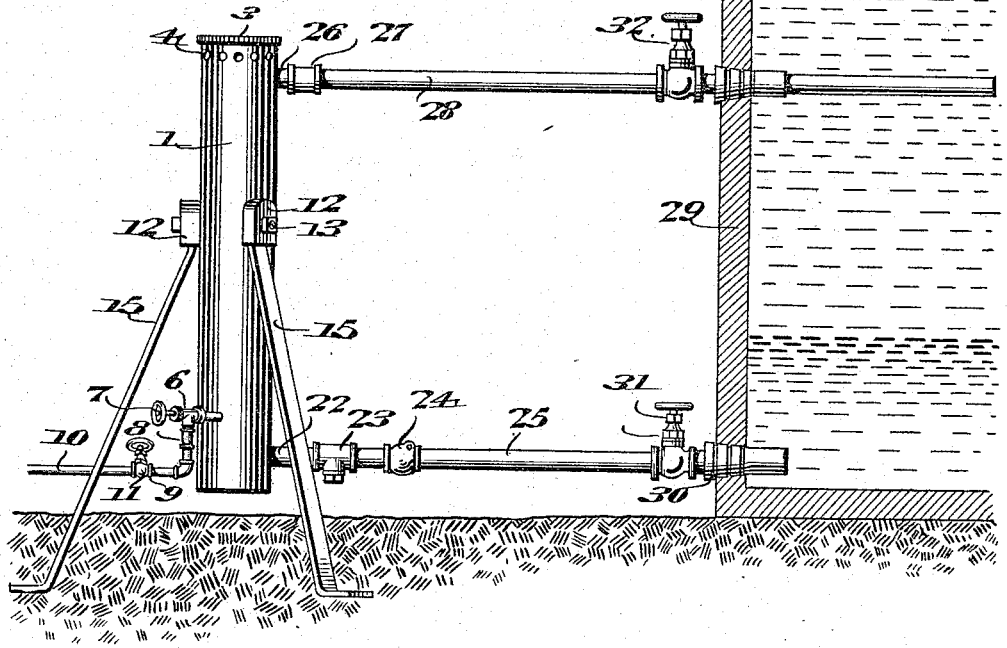
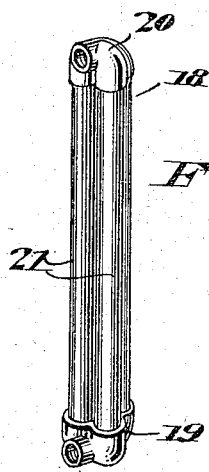
Witnesses
M. H. Slifer.
J. W. Garner
Inventor
L. G. Mc. Corry
By Victor J. Evans
Attorney

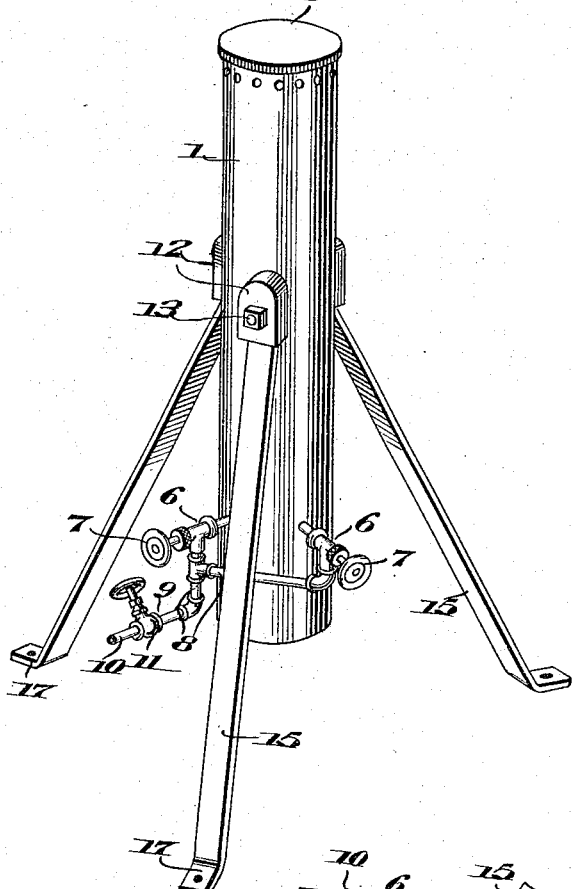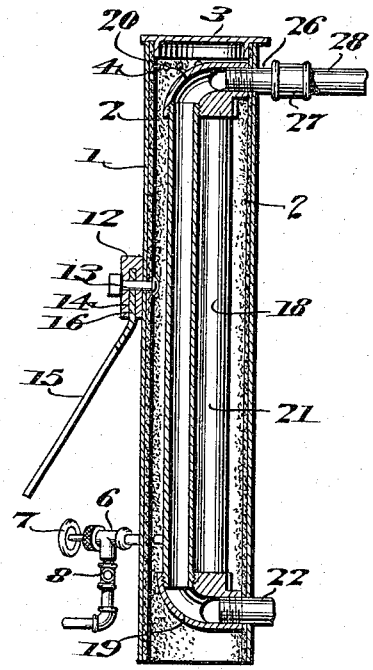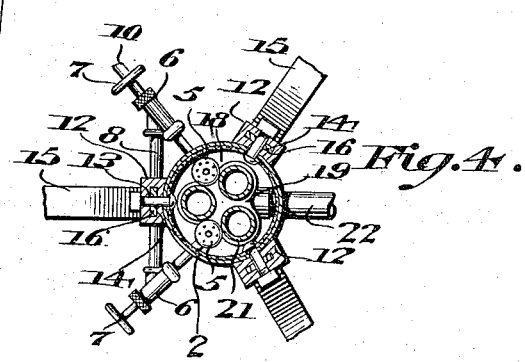

UNITED STATES PATENT OFFICE.

LENN G. McCORRY, OF KARNS CITY, PENNSYLVANIA.

OIL-HEATER.

1,178,405.  Specification of Letters Patent.  Patented Apr. 4, 1916.

Application filed March 31, 1914. Serial No. 828,584.

*To all whom it may concern:*

Be it known that I, LENN G. McCORRY, a citizen of the United States, residing at Karns City, in the county of Butler and State of Pennsylvania, have invented new and useful Improvements in Oil-Heaters, of which the following is a specification.

This invention is an improved heater or steamer, especially adapted for use in oil fields for heating or steaming petroleum in an oil tank, the object of the invention being to provide an improved heater of this class which is adapted to be operated by natural gas, which may be readily set up and taken down, which may be assembled and disassembled and which may be readily connected to and disconnected from an oil tank, so that the heater may be used at different times for steaming or heating oil in various tanks.

A specific object of the invention is to effect improvements in the construction of the boiler through which the water circulates and in which the water is heated for heating or steaming the oil in a tank.

Another object is to effect improvements in the construction of the casing in which the boiler is arranged.

Another object is to provide the heater with supporting legs which may be readily attached thereto and disconnected therefrom and by means of which the heater may be supported in a vertical position and securely anchored and prevented from being overturned or dislodged.

Another object is to effect improvements in the connections between the heater and the oil tank with which it is used.

The invention consists in the construction, combination and arrangement of devices hereinafter described and claimed.

In the accompanying drawings:—Figure 1 is an elevation of an oil heater constructed in accordance with my invention, showing the same set up and connected to an oil tank and arranged in operative relation thereto for heating or steaming the oil in the tank, the tank being indicated in section. Fig. 2 is a detail perspective view of my improved heater. Fig. 3 is a detail vertical sectional view of the same. Fig. 4 is a detail horizontal sectional view of the same. Figs. 5 and 6 are detail views.

In accordance with my invention I provide a cylindrical casing 1 which is made of plate iron or steel and which is lined with asbestos as at 2 or other refractory material. The bottom of the casing is open, and the top of the casing is formed by a cap 3, the wall of the casing at its upper end being formed with openings 4 directly below the cap for the escape of the products of combustion. Around the casing, at a suitable distance from its lower end, are gas burners and air mixtures 5 of suitable construction and each of which is provided with a needle valve 6 having an operating wheel or handle 7. These burners may be supplied with natural gas or with any suitable form of combustible gas and are provided with feeder pipe connections 8 which may be coupled, as at 9, to a gas supply pipe 10, leading from a natural gas well or from a suitable gas tank or reservoir. The main member of the feeder pipes is provided with a cutoff valve 11 for regulating the supply of gas to the burners. These burners serve to heat the circulating boiler hereinafter described.

On the outer side of the casing 1, at a suitable distance from the upper end thereof, are radially arranged blocks 12 which are spaced equi-distant apart and are secured to the casing by means of bolts 13. In each block is a downwardly opening vertical socket 14.

Supporting legs 15 are provided which incline upwardly and converge, so as to form a tripod. Each supporting leg has a bent vertical upper end 16 which is adapted to be inserted and secured in the socket of one of the blocks 12. The lower ends 17 of the supporting legs are outturned and arranged horizontally, when the supporting legs are attached to the casing. The flat, horizontal, lower ends of the supporting legs may bear on the ground or may be buried therein at any desired depth in order to firmly anchor and secure the heater in place and prevent it from being overturned or dislodged, and to permit the open end of the casing to be spaced a sufficient distance from a supporting surface with which the legs on the casing contact to enable the draft through the casing to direct the flames from the burners against the lower portion of the boiler tube and prevents the overheating of the oil in the upper portion of said tube when the burners are first ignited.

A circulating boiler 18 is arranged in the casing of the heater and spaced from the wall thereof and comprises lower and upper heads 19 and 20 and vertically arranged tubes 21 which connect the said heads. Each of the heads is hollow and has three threaded openings in which the ends of the tubes 21 are screwed, the tubes being spaced apart and arranged, in cross section, in triangular relation. A feed-pipe 22 is connected to the lower head 19 and to this feed pipe is attached a drain valve 23 and a check valve 24, the latter providing a union or coupling for the attachment of a pipe 25. A discharge pipe 26 is attached to the upper head 20 and is provided with a union or coupling 27 for the attachment of a pipe 28. The pipes 22 and 25 extend through one side of the casing 1 and serve to space the boiler from the wall of the casing, arrange the boiler in the center of the casing and also support the boiler in the casing.

When the heater is set up, and used in connection with an oil tank 29 for heating or steaming oil, as it is called, in the oil tank, the pipe 25 is connected to the tank, near the bottom thereof and by means of a tapered nipple 30 which taps the tank at the point where there is a body of water under the body of oil in the tank and the said nipple is provided with a stop cock 31. The pipe 28 is connected to the oil tank at a point below the surface of the body of oil in the tank and is sufficiently long to extend nearly across the tank. The pipe 28 also has a stopcock 32. In installing the heater and connecting it to an oil tank care should be observed to have the bottom of the boiler in the heater somewhat lower than the body of the water in the bottom of the oil tank, in order that the water may flow from the lower portion of the oil tank to the boiler through the pipe 25.

In the operation of my improved heater, when the burners have been ignited, the flames from the burners are directed to the tubes of the boiler near the base of the latter so that the lower portions of the boiler tubes are heated by the direct application of flame thereto. Hence an intermittent circulation of water is maintained, therein, the water entering the boiler from the body of water in the oil tank through the return pipe 25 and becoming heated and passing back from the upper end of the boiler through the flow pipe 28 into the body of oil in the oil tank, the resulting steam condensing as it passes through the body of oil and descending to the body of water in the bottom of the oil tank and hence the oil in the tank becomes heated and the water in the bottom of the oil tank is utilized as a medium for heating the oil, more of the oil passing through or being directly heated by or in the boiler and hence there is no loss of oil by the use of my heater.

The water in an oil tank usually contains a large percentage of salt. In the operation of my improved heater the water passes therethrough in a solid body and is heated, carrying all salt and foreign substances with it, through the heater and without having an opportunity to leave a deposit therein.

The heat is supplied to the boiler near the base by the burners so that the water in the base is heated to the boiling point but the upper portion of the boiler is not so highly heated. Hence the steam generated in the base of the boiler is condensed back to water in the upper portion of the boiler and the expansive force of the boiling water in the base of the boiler causes the water to pass from the upper portion of the boiler through the pipe 28 to the tank. A fresh supply of water from the tank then passes through the pipe 25 to the boiler, the action of the boiler being intermittent. Hence water is never vaporized in the boiler, the salt and foreign substances are not precipitated in the boiler but are carried back to the tank and the boiler is prevented from becoming clogged.

It will be observed that the boiler in the heater affords straight conduits for the water heated therein, thus greatly facilitating the passage and circulation of the water therethrough and greatly hastening and promoting the process of heating the oil in the tank.

Having thus described my invention, I claim:—

A heater consisting of a pair of substantially triangular shaped headers, three vertically disposed tubes received in said headers, forwardly projecting nipples carried by said headers adapted to contact the inner circumference of said cylindrical member, a pair of burners disposed within said cylindrical member and in contact, each being in contact with two of said vertically disposed tubes, one of which is engaged in common by said burners whereby said burners prevent the contacting of said tubes and the inner circumference of said cylindrical member, said burners being spaced apart to permit one of said tubes passing between the same, a pair of fuel supplying pipes tapped into said cylindrical member with their inner ends converging in said member, said burners connected to said tube pipes, and supported thereby, and a connection between said pipe outside of said cylindrical member, and a circulating pipe passing through said cylindrical member and received in said nipples whereby to form said vertical tubes.

In testimony whereof I affix my signature in presence of two witnesses.

LENN G. McCORRY.

Witnesses:
B. KEMPER,
GEO. E. THOMAS.

Copies of this patent may be obtained for five cents each, by addressing the "Commissioner of Patents, Washington, D. C."